United States Patent [19]

Formanek et al.

[11] 4,268,357
[45] May 19, 1981

[54] POSITIVE LOCK HOLDDOWN DEVICE

[75] Inventors: Frank J. Formanek, West Suffield; Glen E. Schukei, South Windsor, both of Conn.

[73] Assignee: Combustion Engineering, Inc., Windsor, Conn.

[21] Appl. No.: 963,625

[22] Filed: Nov. 24, 1978

[51] Int. Cl.³ .............................................. G21C 3/30
[52] U.S. Cl. ...................................... 176/78; 176/76; 176/81
[58] Field of Search .............................. 176/76, 78, 81

[56] References Cited

U.S. PATENT DOCUMENTS

| | | |
|---|---|---|
| 3,057,793 | 10/1962 | Coates et al. |
| 3,389,056 | 6/1968 | Frisch |
| 3,549,491 | 12/1970 | Johnson |
| 4,038,133 | 7/1977 | Bittermann et al. |
| 4,134,790 | 1/1979 | Bevilacqua et al. |

FOREIGN PATENT DOCUMENTS 1265964  3/1972  United Kingdom ................. 176/76

Primary Examiner—Peter A. Nelson
Attorney, Agent, or Firm—L. James Ristas

[57] ABSTRACT

An apparatus for providing a high, positive locking force at the bottom of a nuclear fuel assembly to resist upward coolant flow forces. A latch on the fuel assembly alignment post is cammed to engage the fuel alignment pin in the core support stand and is linked to an actuating rod extending through the lower end of the fuel assembly center guide tube. The upward flow of coolant against the link and actuating rod causes the link to approach the horizontal, thereby exerting a high locking force between the latch and the fuel alignment pin. In the preferred embodiment spring means interact between the lower end fitting and the actuating rod to maintain an upward bias on the rod.

13 Claims, 4 Drawing Figures

4,268,357

POSITIVE LOCK HOLDDOWN DEVICE

BACKGROUND OF THE INVENTION

This invention relates to nuclear reactor fuel assemblies and in particular to holddown devices for such assemblies.

In conventional pressurized water nuclear reactors, each nuclear fuel assembly rests on the core support stand and is properly positioned thereon when the fuel assembly alignment posts are firmly in place against the fuel assembly alignment pins in the core support stand. During core operation coolant is pumped into the region below the core support stand, continues upward through the fuel assembly lower end fitting, then flows into the active fuel region of the core. The rapid upward flow of the coolant exerts large forces over the entire length of the fuel assembly, tending to lift the assembly from the support stand. The assembly must be held firmly against these forces, but cannot be permanently attached to the support stand because periodic refueling of the reactor requires removal or relocation of each assembly.

Prior methods of holding down the fuel assembly include spring devices at the top or bottom of the assembly which operate to bias the assembly against a fixed structure in the reactor vessel such as the fuel alignment plate at the upper end of the core or the core support stand at the bottom. Other devices have been proposed which lock the end fitting against the adjacent alignment pins as the fuel assembly is inserted into place. These kinds of devices have several disadvantages. Some, such as the vertical spring bias, exert compressive loads on structural members of the fuel assembly and contribute to bowing of the assembly after extended use. In others the holddown force is not strong enough to prevent fuel assembly vibration. Yet another problem, particularly with the devices having springs on the lower end fitting for engagement with the alignment pins, is that the force required to disengage the assembly is very high and produces undesirable wear on the alignment pins. Also, bottom mounted holddown devices are often relatively large and result in an undesirably high pressure drop between the core inlet and the fuel region of the reactor. Finally, most of these prior art devices are expensive to manufacture.

SUMMARY OF THE INVENTION

One object of the present invention is to utilize the force of the upward coolant flow in the reactor to actuate a positive latching mechanism for holding the fuel assembly in place against the core support stand.

It is a further object to permit easy unlatching of such an assembly to facilitate fuel assembly removal.

It is a further object to hold down the fuel assembly with a device that is compact, easy to manufacture and operate, and that does not contribute significantly to the coolant pressure drop in the reactor vessel.

It is yet another object to provide an assembly that can be remotely unlocked in the event that the usual locking components fail.

According to the invention, a latch between the fuel assembly alignment post and the alignment pin on the core support stand is actuated to engage the pin by the upward motion of an actuating rod. The actuating rod is connected to the latch by a rigid link of fixed length, forming a toggle mechanism. The rotatable junctures of the latch and post, the latch and link, and the link and rod are oriented such that as the rod is lifted by the upward force of the flowing coolant, the link approaches the horizontal. Since the link is of a fixed length, the latch must move toward the pin to accommodate the link motion. The lower end of each latch is adapted to engage an alignment pin. The invention therefore provides an increasing locking force between the latch and the pin as the flow force against the rod increases. The latch is disengaged by merely pushing down on the actuating rod, which has the effect of pulling the latch away from the pin.

The inventive holddown design thus provides positive locking of the fuel assembly onto the core support stand and also forces the assembly down against the stand during reactor operation when the coolant is flowing upward through the reactor. During the removal of the fuel assemblies when there is no coolant flow, the grappling tool will automatically unlatch the fuel assembly holddown device thus permitting its removal from the core support stand. Although the invention requires several moving parts, its ability to provide positive latching during reactor operation is a great advantage that overcomes this possible disadvantage. The prior art upper and lower end fitting designs which provided fuel assembly holddown can be greatly simplified by the reduction in spring rates or even elimination of the springs with a resulting decrease in the cost of fuel assembly fabrication. The inventive design is relatively easy to fabricate and presents a small surface area to the upward flow of coolant whereby the pressure drop prior to entry into the fuel region is small compared with prior art bottom mounted devices.

BRIEF DESCRIPTION OF THE DRAWINGS

Other objects and advantages of the invention will be evident from the description that follows and from the Figures in which.

DESCRIPTION OF THE PREFERRED EMBODIMENT

Figure 1:
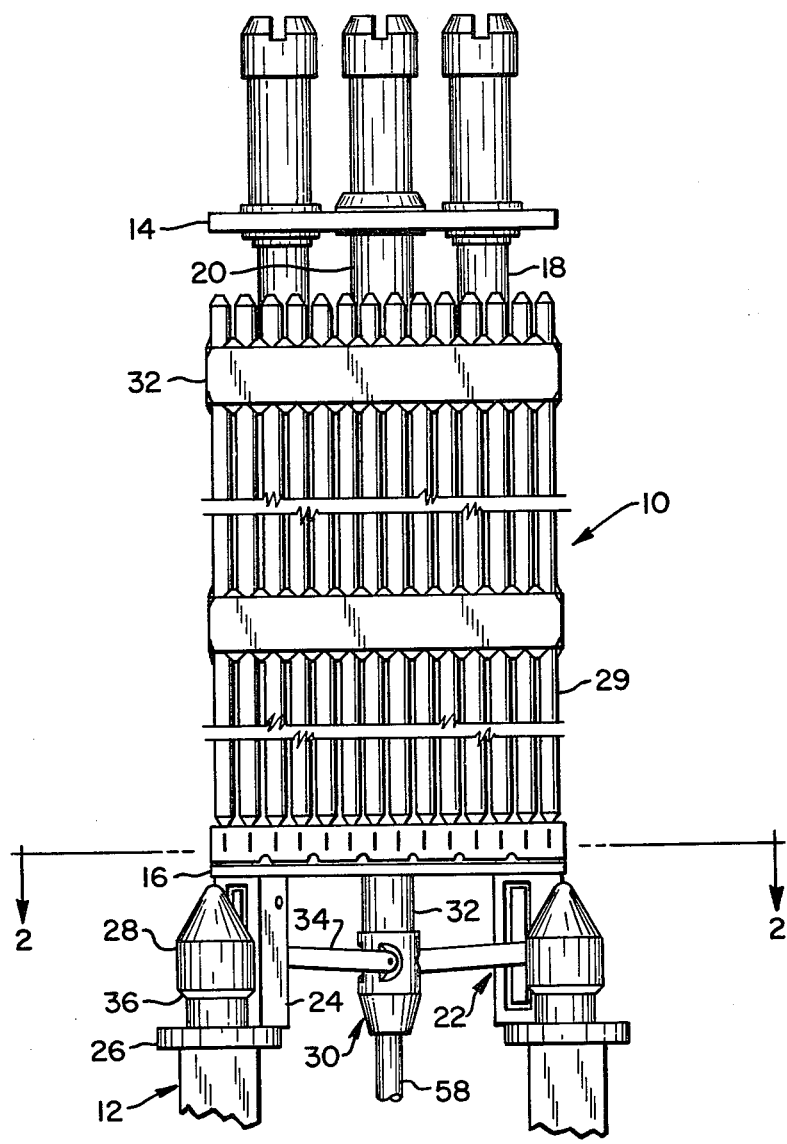
FIG. 1 is an elevation view of a nuclear reactor fuel assembly employing the invention.

FIG. 1 shows a fuel assembly 10 located on a core support stand 12. The fuel assembly skeleton consists of upper and lower end plates 14, 16 to which are fixedly connected a plurality of hollow outer and center guide tubes 18, 20. The lower end plate 16 forms the upper portion of the lower end fitting 22. The alignment posts 24 form the lower portion of the lower end fitting 22 and are adapted to rest on the base 26 of the core support stand alignment pins 28, and to abut the pins when the assembly is properly placed on the core support stand 12. Fuel rods 29 are supported between the upper and lower end plates 14, 16 by means of spacer grids 32 which are rigidly connected to the guide tubes 18, 20 and which form a matrix for spacing and supporting the individual fuel rods.

The present invention relates to the structure on the lower end fitting 22 which provides a positive locking force to hold the fuel assembly 10 down on the base 26 of the core support stand 12. The locking assembly includes an actuating rod 30 movable vertically with respect to the lower end plate 16 and extending through an extension 32 of the lower end fitting 22. Link arms 34 connect the actuating rod 30 to latches (not shown) which are adapted to engage a shoulders 36 on the pins 28. The latch is hidden from view in FIG. 1 but will be shown in more detail below. The locking action is provided by the upward force of the coolant against the lower end of the actuating rod 30 as described below.

Figure 2:
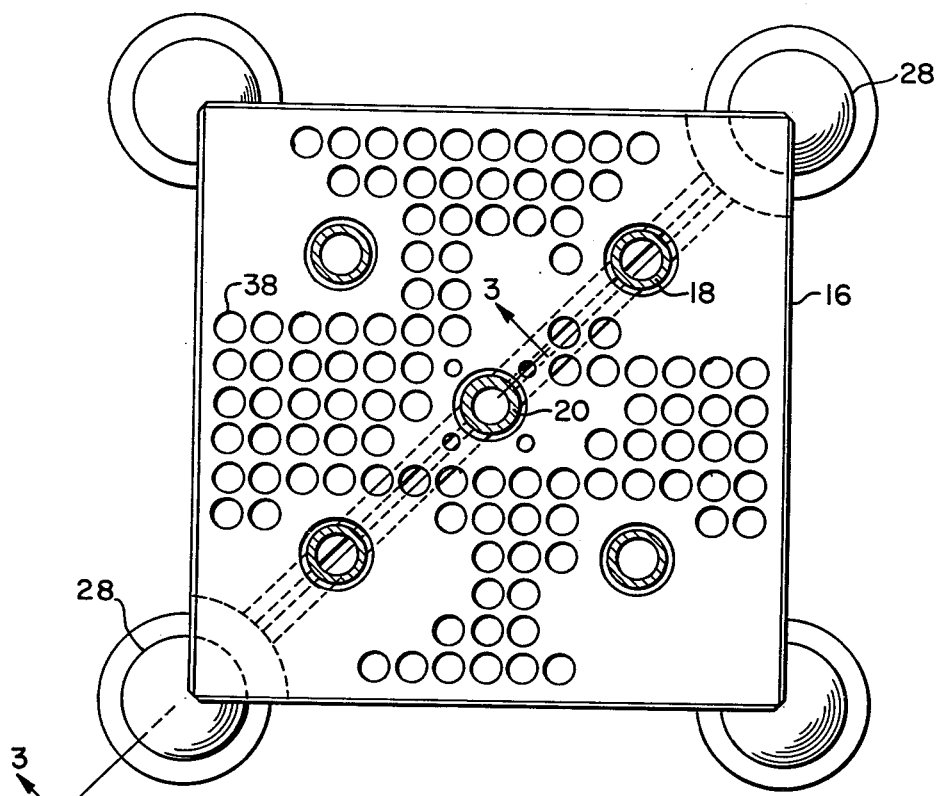
FIG. 2 is a section along the lines 2—2 of FIG. 1.

FIG. 2 shows that the lower end plate 16 has a plurality of openings 38 through which the coolant may flow upward into the fuel-bearing region of the core. Four outer guide tubes 18 are equally spaced about a center guide tube 20 which in the preferred embodiment of the invention serves as a guide means for actuating the locking assembly, shown schematically in phantom below the lower end plate 16. It may be seen that the locking assembly is oriented along a diagonal of the lower end fitting 16 and interacts between opposite a alignment pins 28.

Figure 4:
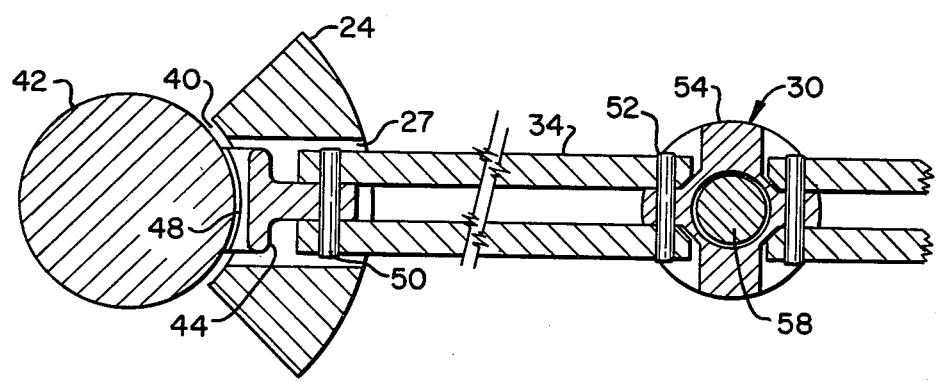
FIG. 4 is a section along the lines 4—4 of FIG. 3.
Figure 3:
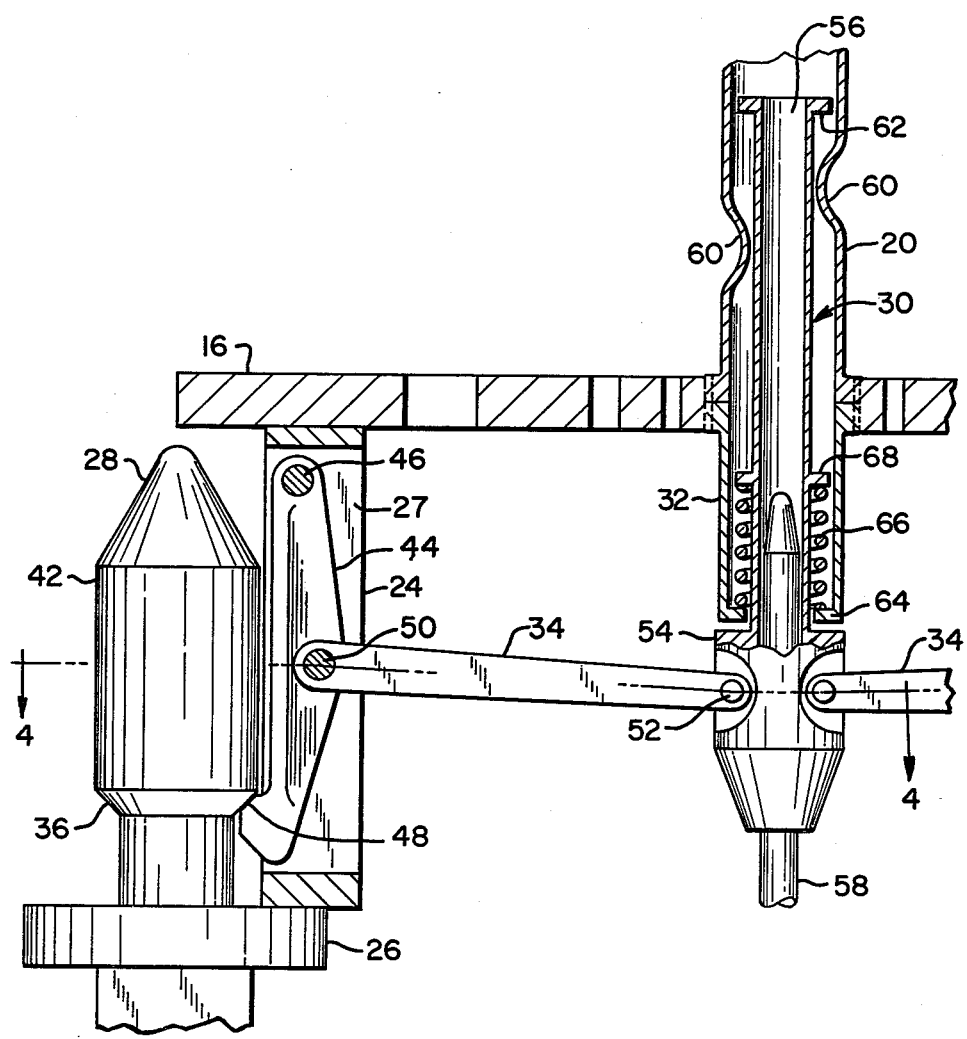
FIG. 3 is a section along the lines 3—3 of FIG. 2 showing the details of the preferred embodiment of the invention.

Referring now to FIGS. 3 and 4 there are shown two views of the locking assembly along the diagonal of the end fitting. Only one side of the symmetric assembly is illustrated. The alignment posts 24 depend from the lower end plate 16 and in the preferred embodiment have a concave outer surface 40 adapted to partially surround the vertical cylindrical surface 42 of the pin 28. The post 24 has an extended vertical slot 27 in its intermediate portion in which a latch 44 and link 34 are free to move. The latch 44 is pivotally connected to the post at 46 and extends downward forming a cam 48 adapted to mate with the shoulder 36 of the pin 28. Intermediate the connection 46 and the cam 48 a pivoted connection 50 to the actuating link 34 enables the latch 44 to cooperate with the actuating rod 30. Each link 34 is pivotally connected at 52 to the collar 54 formed at the lower end of the actuating rod 30. The link 34 has a length which requires the cam 48 to firmly engage the shoulder 36 when the pivot connections 50, 52 at both sides of each link 34 are nearly horizontal.

In FIG. 4 it can be seen that the cam 48 has a curvature similar to that of the arc of the shoulder 36 and extends for approximately 45 degrees along the circumference thereof. Since the outer surface of the post 24 spans approximately 90 degrees of the pin circumference, the cam portion of the latch is hidden from view when the assembly is positioned on the support stand as shown in FIG. 1. The 45 degree arc of the cam and the double arm structure of the link member 34 between each latch 44 and the actuating rod 30 help distribute the extremely high forces that can be generated when the links 34 approach the horizontal.

In the preferred embodiment the actuating rod 30 extends upward through the center guide tube 20 and defines a space 56 through which in-core nuclear instrumentation 58 may be moved during core operation to measure the performance of the fuel assembly. The center guide tube 20 is conventionally welded to the lower end plate 16 and in the preferred embodiment is dimpled as shown at 60 in order to center the actuating rod 30 therewithin. At a convenient axial location, the actuating rod 30 has actuating flanges 62 formed to provide a surface on which an unlocking tool can be mounted to depress the rod 30 and unlock the latch 44 as described below.

In the preferred embodiment the lower end plate 16 has a tubular extension housing 32 welded thereto, the lower annulus of the extension providing a stop means 64 for a spring 66 surrounding the portion of the actuating rod 30 immediately above the collar 54. An annular washer 68 is fixedly attached to the actuating rod 30 to hold the spring 66 in compression whereby an upward bias is maintained on the actuating rod 30. This feature in the preferred embodiment of the invention provides a redudant actuation force and is not essential for operation of the invention. For example, eliminating the spring 66 might require more careful design of the link 34 and collar 54 to assure that adequate surface area is presented to the flowing coolant to provide sufficient upward lift on the link connection at 52. In the embodiment including the spring 66, a relatively small spring force is required since the flow action assists the upward movement of the collar 54, and in addition the upward flow against the lower end plate 16 tends to lift the annular flange 64 on the lower end plate extension 32 resulting in an upward bias of the spring 66 on the washers 68. The lower end 64 of the end plate extension 32 also provides a stop for the actuation collar 54 to prevent the link 34 to reaching the horizontal position or to rising still farther and disengaging the cam 48.

To insert or remove the assembly 10 from the reactor, a conventional refueling machine grapping tool (not shown) can be modified to include an elongated member for insertion into the center guide tube 20 to depress the actuator stops 62. This depresses the collar 54 and draws the cam 48 within the post 24. In the event that some unforeseen problem should develop so that the spring 66 would hold the pivot 52 in the up position during refueling thus locking the assembly into place and preventing removal of the assembly, it would be quite simple to load the actuating rod 30 with enough force to shear the end plate extension 32, thus destroying the annular stop 64 and neutralizing the spring so that the collar 54 can easily be pushed downward releasing the cam 48. It may be appreciated that locking and unlocking of the assembly is made without applying bending loads to the fuel support structure of the assembly.

It may be seen that, although a very large holddown force can be generated with the present invention, the use of oppositely disposed link members 34 along the assembly diagonal produces opposed loads on the collar 54 and thus minimizes the bending loads on the actuator rod 30 and guide tube 20. Also, the inclined surfaces on the fuel alignment pin 36 and the cam 48 allow for large tolerances to be accommodated since movement of the latch 44 in the horizontal direction will in effect vary the engagement length required for the latch. Likewise, the components can be manufactured with rather loose tolerances since the unit is essentially self-adjusting. The assembly 10 tends to become centered with respect to the alignment pins 28 thus improving overall alignment of all assemblies in the reactor. The positive locking action will ratchet to the tightest position and allow no movement of the lower end fitting 22 against the support stand 12 during core operation.

We claim:

1. A nuclear fuel assembly to be locked into first mating surfaces on a core support stand, comprising:
   a lower end fitting having a plurality of posts for resting on the stand;
   elongated latch means pivotally connected at one end to the lower end fitting and having second mating surface at the other end adapted to engage the first mating surface;

actuating means located between two of the posts and being vertically movable relative to the end fitting; and rigid link means pivotally attached at one end to the latch means intermediate the connection of the latch means to the end fitting and the second mating surface and pivotally attached at the other end to the actuating means thereby forming a toggle mechanism, the link means having a length between the pivoted connections such that the second mating surface on the latch locks into engagement with the first mating surface on the stand as the link pivots approach the horizontal.

2. A nuclear fuel assembly to be located on a core support stand having shouldered alignment pins, comprising:

a lower end fitting including a plurality of vertical alignment posts, each adapted to be located in close proximity to an alignment pin when the assembly is in proper position on the stand;

latch means pivotally connected at one end to the upper portion of at least one of the posts and having a cammed portion at the other end facing the shoulder on the pin when the assembly is in proper position on the stand;

a vertically movable actuating rod extending through the lower end fitting opposite and centrally located relative to the posts; and link means pivotally attached at one end to the latch means intermediate the latch pivot and cam and at the other end to the actuating rod thereby forming a toggle mechanism, said link means having a fixed length between the pivot connection such that the cam firmly engages the shoulder as the link approaches the horizontal.

3. The assembly of claim 2 wherein said end fitting is square and has a post at each corner and wherein two of the diagonally opposite posts have latch means connected thereto and to said actuating rod.

4. The assembly of claim 3 wherein said end fitting has a vertical housing on its underside through which the actuating rod may be reciprocated.

5. The assembly of claim 4 wherein said post means having a latch connected thereto have a hollow intermediate portion through which said latch can move.

6. The assembly of claim 4 further comprising a center guide tube extending from said end fitting to the upper end of the assembly, and wherein said actuating rod is located partly within said center guide tube.

7. The assembly of claim 4 wherein the lower end of said housing forms a stop surface for limiting the upward movement of the actuating rod whereby the link pivot to the rod is prevented from rising higher than the link pivot to the latch.

8. The assembly of claim 4 further including means associated with said housing and said actuating rod for upwardly biasing said actuating rod.

9. The assembly of claim 4 wherein said actuating rod includes a collar formed at its lower end, said collar being adapted to provide the pivotal connection between said links and said rod.

10. The assembly of claim 4 wherein said housing includes an internal flange surrounding said actuating rod; said actuating rod includes a washer affixed thereto above said housing flange; and wherein spring means are interposed between said housing flange and said rod washer for upwardly biasing said rod relative to said housing.

11. The assembly of claim 4 wherein said actuating rod has a hollow center over its entire length.

12. The assembly of claim 10 wherein the flange in said housing is weaker than the washer on said rod whereby the housing flange will preferentially break if excessive downward force is applied to said actuating rod.

13. The assembly of claim 11 wherein said actuating rod includes flanges thereon by which the rod may be depressed from above the fuel assembly through the guide tube.

* * * * *